(12) United States Patent
Ginzburg et al.

(10) Patent No.: US 8,357,299 B2
(45) Date of Patent: Jan. 22, 2013

(54) PROCESS CONTROL FOR AN IMMERSED MEMBRANE SYSTEM

(75) Inventors: Boris Fernandes Ginzburg, Toronto (CA); Francois Yacoub, Oakville (CA); Pierre Lucien Cote, Dundas (CA); Arnold Janson, Burlington (CA)

(73) Assignee: Zenon Technology Partnership, Wilmington, DE (US)

( * ) Notice: Subject to any disclaimer, the term of this patent is extended or adjusted under 35 U.S.C. 154(b) by 1701 days.

(21) Appl. No.: 11/484,815

(22) Filed: Jul. 11, 2006

(65) Prior Publication Data
US 2007/0039888 A1 Feb. 22, 2007

Related U.S. Application Data (60) Provisional application No. 60/697,974, filed on Jul. 12, 2005, provisional application No. 60/697,953, filed on Jul. 12, 2005, provisional application No. 60/751,979, filed on Dec. 21, 2005.

(51) Int. Cl.
*B01D 61/00* (2006.01)
(52) U.S. Cl. ....................................... 210/650
(58) Field of Classification Search .................. 210/650
See application file for complete search history.

(56) References Cited

U.S. PATENT DOCUMENTS

| | | | |
|---|---|---|---|
| 3,490,590 A * | 1/1970 | Davies .......................... | 210/616 |
| 4,002,567 A | 1/1977 | Konno et al. | |
| 4,277,255 A | 7/1981 | Apelgren | |
| 4,482,461 A | 11/1984 | Hindman et al. | |
| 4,540,490 A | 9/1985 | Shibata et al. | |
| 4,832,743 A | 5/1989 | Perovetz et al. | |
| 4,921,610 A | 5/1990 | Ford et al. | |
| 5,024,762 A | 6/1991 | Ford et al. | |
| 5,043,071 A | 8/1991 | Anselme et al. | |
| 5,066,402 A | 11/1991 | Anselme et al. | |
| 5,878,374 A | 3/1999 | Buchanan et al. | |
| 6,077,435 A | 6/2000 | Beck et al. | |
| 6,162,020 A | 12/2000 | Kondo | |
| 6,245,239 B1 | 6/2001 | Cote et al. | |
| 6,550,747 B2 | 4/2003 | Rabie et al. | |
| 6,616,843 B1 | 9/2003 | Behmann et al. | |
| 7,179,370 B2 | 2/2007 | Dimitriou et al. | |
| 2003/0136737 A1 | 7/2003 | Glynn | |

(Continued)

FOREIGN PATENT DOCUMENTS

| | | |
|---|---|---|
| AU | 735103 B2 | 6/2001 |
| CA | 1218475 A1 | 2/1987 |

(Continued)

OTHER PUBLICATIONS

Cabassud et al., "Neural networks: a tool to improve UF plant productivity," Desalination 145 (2002) 223-231.*

(Continued)

*Primary Examiner* — Bobby Ramdhanie
*Assistant Examiner* — Denise R Anderson
(74) *Attorney, Agent, or Firm* — Scott Pundsack; Borden Ladner Gervais LLP (57) ABSTRACT

An immersed membrane system or process may use measured or calculated process information to optimize one or more process operating parameters to improve performance or reduce operating costs. An on-line process control system or method may use the resistance in series method in operating an immersed membrane water treatment system. A process control system or process may consider resistance values and adjust operational parameters such as membrane aeration frequency factor, membrane aeration flow, permeate flux, permeation duration, backwash flow and duration, relaxation duration or maintenance or recovery chemical cleaning frequencies in order to reduce the operational costs related to membrane fouling removal.

9 Claims, 6 Drawing Sheets

U.S. PATENT DOCUMENTS

| | | |
|---|---|---|
| 2004/0232076 A1 | 11/2004 | Zha et al. |
| 2005/0006308 A1 | 1/2005 | Cote et al. |
| 2005/0082224 A1 | 4/2005 | Glynn |
| 2005/0133443 A1 | 6/2005 | Applegate et al. |
| 2006/0201876 A1 | 9/2006 | Jordan |
| 2007/0039888 A1 | 2/2007 | Ginzburg et al. |
| 2011/0042312 A1 | 2/2011 | Ginzburg et al. |

FOREIGN PATENT DOCUMENTS

| | | |
|---|---|---|
| CA | 2279766 A1 | 1/2001 |
| DE | 4230825 | 3/1993 |
| EP | 0814887 B1 | 6/2003 |
| EP | 1300186 B1 | 2/2007 |
| EP | 1655066 B1 | 10/2009 |
| FR | 2674448 A1 | 10/1992 |
| JP | 62144707 | 6/1987 |
| JP | 62144712 | 6/1987 |
| JP | 63069509 | 3/1988 |
| JP | 1119680 A | 5/1989 |
| JP | 2277528 | 11/1990 |
| JP | 03-068426 | 3/1991 |
| JP | 05154358 | 6/1993 |
| JP | 6063327 | 3/1994 |
| JP | 6134484 | 5/1994 |
| JP | 7008711 | 1/1995 |
| JP | 7185271 A * | 7/1995 |
| JP | 9038684 A * | 2/1997 |
| JP | 9075938 A * | 3/1997 |
| JP | 11128690 A * | 5/1999 |
| JP | 2002011472 A * | 1/2002 |
| JP | 2003340250 | 12/2003 |
| JP | 2005-144291 | 6/2005 |
| WO | 85/02554 A1 | 6/1985 |
| WO | 88/00494 A1 | 1/1988 |
| WO | 88/01529 A1 | 3/1988 |
| WO | WO 96/22151 | 7/1996 |
| WO | 96/32183 | 10/1996 |
| WO | WO 02/47800 | 6/2002 |
| WO | WO 03/008076 | 1/2003 |
| WO | WO 03/031034 | 4/2003 |
| WO | WO 03/082450 | 10/2003 |
| WO | WO 2004/009497 | 1/2004 |
| WO | WO 2005/039742 | 5/2005 |
| WO | WO 2005/039742 A1 | 5/2005 |
| WO | WO 2005/049510 | 6/2005 |

OTHER PUBLICATIONS

European Search Report from European Application No. 11152729.7, dated Mar. 25, 2011.
Ramerii NV, English language abstract of JP1119680, published May 11, 1989.
Espinosa-Bouchot, M. et al., Gas sparging in a membrane bioreactor for wastewater treatment. The fifth International Membrane Science and Technology Conference (IMSTEC'03). Sydney, Australia, Nov. 10-14, 2003.
Kubota Corp, English language abstract of JP03-068426, published Mar. 25, 1991.
Matthiasson, Einar and Bjorn Sivik, Concentration Polarization and Fouling, Desalination, vol. 35, pp. 59-103, 1980.
Li, Norman N.,et al., Advanced Membrane Technology and Applications, John Wiley & Sons, 2008, pp. 149-170.
Faibish, Ron S. and Yoram Cohen, Fouling and rejection behavior of ceramic and polymer-modified ceramic membranes for ultrafiltration of oil-in-water emulsions and microemulsions, Colloids and Surfaces A-physicochemical and Engineering Aspects, vol. 191, No. 1, pp. 27-40, 2001.
Murkes, Jakob, Crossflow filtration: theory and practice, John Wiley & Sons Ltd., 1988, pp. 59-60.
Toshiba Corp., English language abstract of JP 05154358, published Jun. 22, 1993.
Toshiba Corp., English language abstract of JP2277528, published Nov. 14, 1990.
Toshiba Corp, English language abstract of JP63069509, published Mar. 29, 1988.
Nippon Atomic Ind Group Co, et al., English language abstract of JP62144712, published Jun. 27, 1987.
Nippon Atomic Ind Group Co, et al. English language abstract of JP62144707, published Jun. 27, 1987.
Manem, J. and R. Sanderson, Water Treatment Membrane Process, AWWA. Research Foundation, McGraw-Hill, 1996, pp. 14.12-14.34.
Hsieh, H.P., Inorganic Membranes for Separation and Reaction, Elsevier Science, 1996, pp. 162-183.
Xu, Yazhen et al., Optimization of a discontinuous microfiltration-backwash process, The Chemical Engineering Journal, 57 (May 1995) 247-251.
Fane, A.G. et al., A Review of Fouling and Fouling Control in Ultrafiltration, Desalination, 62 (1987) 117-136.
Padilla-Zakour, O. and M.R. McLELLAN, Optimization and Modelling of Aple Juice Cross-flow Microfiltration with a Ceramic Membrane, Journal of Food Science, vol. 58, No. 2, 1993. pp. 369-374.
Matsumoto, Kanji et al., Cross-Flow Filtration of Yeast by Microporous Ceramic Membrane with Backwashing, J. Ferment. Technol., vol. 66, 1988. pp. 199-205.
Galaj, S. et al., Microfiltration tangentielle avec decolmatage sur membranes ceramiques, Le Lait (1984), 64. pp. 129-140.
Matsuo Sangyo KK, English language abstract of JP6063327, published Mar. 8, 1994.
Hitachi Plant Eng & Constr Co, English language abstract of JP6134484, published May 17, 1994.
Remize, P.J. et al., From a new method to consider backwash efficiency to the definition of remaining fouling, Desalination 199 (2006) 86-88.
Wilf, Ilan, New Membrane Research and Development Achievements, But the Best is Yet to Come, Hydranautics, http://www.hydranautics.comidocsipapers/05_new_membrane.pdf, undated.
Peiris, R.H., et al, Optimization of a Membrane Filtration Process for Drinking Water Production Using On-Line Fluoroscene and Permeate Flux Measurements, 18th IFAC World Congress, Milano (Italy) Aug. 28-Sep. 2, 2011, pp. 3783-3788.
Chung, Doo Hyun, Evaluation of GE Water & Process Technology's UF Membrane at Various Water Quality Parameters, Harvey Mudd College, California, U.S.A. http://www.hmc.edu/files/environcenter/steinbergwebpage/research2/chungreport.pdf, Mar. 17, 2011.
Hong, Seungkwan et al., Variations in backwash efficiency during colloidal filtration of hollow-fiber microfiltration membranes, Desalination 173 (2005) pp. 257-268.
Decarolis, James et al., Fouling behavior of a pilot scale inside-out hollow fiber UF membrane during dead-end filtration of tertiary wastewater, Journal of Membrane Science 191 (2001) 165-178.
Jiang, T. et al., Controlling membrane pore blocking and filter cake build-up in side-stream MBR systems, Proceedings 5th International Membrane Science & Technology Conference (IMSTEC'03), Sydney, Australia, Nov. 10-14, 2003.
Delgrange-Vincent, N. et al., Neural networks for long term prediction of fouling and backwash efficiency in ultrafiltration for drinking water production, Desalination 131 (2000) 353-362.
Redkar, Sanjeev et al., Modeling of concentration polarization and depolarization with high-frequency backpulsing, Journal of Membrane Science 121 (1996) 229-242.
Li, Mingyang et al., Effect of cake layer characteristics on fouling control in long time filtration without backwash for submerged ceramic MF membrane in surface water treatment, Delft University of Technology, The Netherlands, 2012. http://www.citg.tudelft.nlifileadmin/Faculteit/CiTG/Gezondheidstechniek/doc/Mingyang_Li_paper_draft-final.pdf.

* cited by examiner

Figure 4 On-line process control system long term testing results.

PROCESS CONTROL FOR AN IMMERSED MEMBRANE SYSTEM

This is an application claiming the benefit under 35 USC 119(e) of U.S. Application Ser. Nos. 60/697,953 filed Jul. 12, 2005; 60/697,974 filed Jul. 12, 2005; and, 60/751,979 filed Dec. 21, 2005. U.S. Application Ser. Nos. 60/697,953; 60/697,974; and 60/751,979 are incorporated herein, in their entirety, by this reference to them.

FIELD OF THE INVENTION

This specification relates to a membrane water treatment system or process, or to a process control system or method for a membrane water treatment system, for example a membrane bioreactor or a system using immersed membranes.

BACKGROUND

The following is not an admission that anything discussed below is prior art or part of the general knowledge of people skilled in the art in any country.

Immersed membrane water treatment systems include, for example, wastewater treatment systems, such as membrane bioreactors, and water filtration systems, for example intended to produce potable water. Such systems may use air or other gases bubbled from under or between the membranes to scour the surface of the membranes to sustain the permeate flowrate for a given transmembrane pressure. The airflow rate is typically constant for a particular installation when expressed as a volume of air per unit membrane area per unit of time. For any of a variety of reasons, the ideal airflow rate at any moment can be significantly different than the normal rate. These reasons may include:

a) changes in permeate flowrate and hence the loading rate of suspended solids onto the membrane surface;

b) changes in water viscosity:
   i) in wastewater systems, whenever sludge is wasted, or if equalization occurs in the membrane tank;
   ii) in drinking water systems, if changes in coagulant dosage are necessary because of changes in feed water composition or if changes in recovery occur; or,
   iii) in all systems if water temperature changes for example due to seasonal variations;

c) changes in inlet blower air temperature or density which will affect the mass of air delivered to the membranes for scouring; or, d) in wastewater systems, changes in sludge filterability due to process changes.

The permeate output from a water filtration system can vary for any number of factors. In municipal applications, factors include the time of day, weather conditions and seasonal fluctuations. In industrial systems, in addition to these factors, production schedules, strikes and plant shutdowns can result in changes in system output.

In wastewater treatment systems in particular (e.g. membrane bioreactors), the influent flows can be highly variable and equalization is generally provided by the system designer. In some installations, equalization is provided upstream of the membrane bioreactor in a separate tank with transfer pumps and in other installations, equalization is provided in the membrane bioreactor tank. In all applications, the viscosity and filterability of the biomass will vary due to process conditions. For example, after sludge is wasted from a bioreactor and fresh feed is introduced, the suspended solids concentration will decrease. In those system designs wherein equalization is provided in the membrane bioreactor, the viscosity will change as the feed flow to the membrane bioreactor varies. When the bioreactor liquid level is near its maximum, the viscosity will be the lowest and when the bioreactor is near its minimum, the viscosity will be at its highest. Sludge filterability will change for any of a variety of conditions including types of biological organisms present, production of extra cellular materials, pH, food to microorganism loading rates (F:M ratio), sludge age, and hydraulic retention time.

Membrane treatment systems consist of any number of separate blocks of membranes, referred to as trains or banks, which collectively produce the required total flow. The output from individual trains can vary as the system output varies for the reasons described previously. In addition, the output from individual trains can be affected by other factors, in particular, the number of trains actually in service (some trains may be out-of-service for maintenance or other reasons) and the degree of fouling of the membranes (if severe enough to limit production from an individual train).

In all membrane treatment applications, there can be defined a "suspended solids mass loading rate". This rate reflects the rate at which suspended solids are brought to the membrane surface by the feed and is calculated as the "suspended solids concentration×the permeate flux" with units of "mass/unit membrane area–time". At equilibrium conditions, the rate at which suspended solids are brought to the membrane surface has to equal the rate at which the turbulence and air scouring effects remove the suspended solids.

In control systems for currently manufactured immersed membrane systems, the practice is to set the aeration rate at a fixed rate based on standard designs or pilot data. During commissioning, some manual optimization may result in a change in aeration rates. Once the commissioning is completed, adjustments to the aeration rates are generally not performed. The aeration rate (m3 of air per m2 of membrane area) is typically at or near the optimum aeration necessary when operating at full capacity or at the highest fluid viscosity and is constant for all the trains in a system.

In immersed membrane treatment systems, the membrane filter is immersed in an open tank containing the solution of fluid to be filtered. Filtration is achieved by drawing water to the inside of membrane fiber under a vacuum. The filtered water, also called permeate or filtrate, is transferred to a downstream tank, reservoir or receiving stream. The materials that do not pass through the membrane, including suspended solids, colloids and biological materials, are discharged as a solution called the reject or retentate. This reject can be discharged either continuously or intermittently depending on the system design. Air or other gases, under a slight positive pressure, are provided to the region of the tank under or near the bottom of the membrane filters. The rising gas bubbles scour the membrane surface to reduce fouling and maintain or slow a decline in permeation rate.

The productivity of an immersed membrane system is directly dependent upon many factors including: differential pressure across the membrane (also called transmembrane pressure), the membrane material and the water's mass transfer rate through the boundary layer at the surface of the membrane. The rising air bubbles create turbulence and cause an upflow of water and the combination of turbulence and the upflow of water reduces the boundary layer thickness and increases the mass transfer rate through the boundary layer. The air can be supplied continuously, cyclically (e.g. 10 seconds on, 10 seconds off) or intermittently (e.g. 60 seconds every 30 minutes). Energy is required to provide this aeration and this can be a significant contributor to the overall energy consumption of an immersed membrane system.

At the surface of the membrane filter, a "boundary layer" exists and all water passing through the membrane must first pass through this boundary layer prior to reaching the membrane's surface. This boundary layer is the thin region at the surface of the membrane where a steep velocity gradient exists and the thinner the boundary layer, the steeper the velocity gradient and the higher the mass transfer rate will be through the boundary layer. The thickness of the boundary layer varies with many factors including viscosity and the velocity of the fluid passing over the surface and the concentration of the materials rejected by the membrane. The air supplied near bottom of the membrane induces turbulence and the higher the air flow rate, the thinner the boundary layer.

Membrane bioreactors (MBR) combine membrane technology and activated sludge biodegradation processes for the treatment of municipal and industrial wastewater. In MBR, immersed or external membranes are used to filter the activated sludge from a bioreactor to produce a high quality effluent. Sample MBRs and their operation are described in International Publication No. WO 2005/039742 A1 which is incorporated herein, in its entirety, by this reference to it.

The membranes may be generally arranged in modules or elements which comprise the membranes and the headers attached to the membranes and may be formed together into cassettes and then trains. The modules are immersed in a tank containing activated sludge. A transmembrane pressure in applied across the membrane walls which causes filtered water to permeate through the membrane walls. Solids are rejected by the membranes and remain in the tank to be biologically or chemically treated or drained from the tank for recycle or further treatment.

A typical treatment cycle comprises two stages. The first stage, known as permeation, involves the production of membrane permeate through the application of transmembrane pressure, as described above.

The second stage involves the removal of solids from the membrane pores and surface. Two different operational procedures available are relaxation and backwash. Relaxation is performed by eliminating the transmembrane pressure which causes the permeate production to stop and allows for the air bubbles to remove the sludge particles deposited on the membrane surface. The other operational procedure available for solids removal is backwash. Backwash is performed by reversing the direction of the permeate flow which allows for the removal of the sludge particles loosely deposited on the membrane pores and surface.

A cyclic air flow may be applied to the modules to minimize sludge particle deposition on the membrane surface. The cyclic aeration system uses a valve set and a valve set controller to connect an air supply to a plurality of distinct branches of an air delivery network. The distinct branches of the air delivery network are in turn connected to aerators which may be located below the membrane modules. While the air supply is operated to supply a steady initial flow of air, the valve set and valve controller split and distribute the initial air flow between the distinct branches of the air distribution system such that the air flow to each branch alternates between a higher flow rate and a lower flow rate in repeated cycles. The relative duration of periods of higher and lower flow rate applied to a given aerator are determined by the aeration frequency factor (A.F.F) which can be obtained by dividing the durations of the period of higher air flow by the total duration of the aeration cycle (i.e. duration of higher air flow period plus duration of lower air flow period) respectively. In practical applications, values between 0.25 and 1 are common. For example, a system having four branches may be alternated between states of (a) providing air continuously to all four branches, (b) providing air cycles of 10 seconds on and 10 seconds off by switching between pairs of the branches, (c) providing a cycle of 10 seconds on and 30 seconds off by providing air to each branch sequentially or (d) be at a continuous air off state. The number of air blowers used in state (b) may be twice that of state (c) and the number of air blowers in state (a) may be twice that of state (b). An apparatus and method for providing cyclic air flow are described in U.S. Pat. No. 6,550,747 which is incorporated herein, in its entirety, by this reference to it.

Air bubbles are introduced to the tank through aerators which may be mounted below or within the membrane modules and connected by conduits to an air blower. The air bubbles rise to the surface of the membrane tank and create an air lift which recirculates mixed liquor in the tank around the membrane module. When the rate of air flow is within an effective range, the rising bubbles and mixed liquor agitate the membranes to inhibit solids in the mixed liquor from fouling the membrane pores. Further, there is also an oxygen transfer from the bubbles to the mixed liquor which, in wastewater applications, provides oxygen for microorganism growth if desired.

Chemical cleanings may also be applied in order to remove those foulants that accumulate on the membrane pores despite the routine application of bubbles, relaxation or backwash. Maintenance chemical cleaning, which requires a less concentrated chemical solution, may be applied to maintain or reduce a rate of decline in membrane permeability. Recovery chemical cleaning, which requires a more concentrated chemical solution, may be applied at a lower frequency to restore membrane permeability when it has fallen considerably.

Membrane fouling is probably the most common operational problem encountered in MBR. Membrane fouling occurs when membranes pores are obstructed resulting in the loss of membrane permeability, which is the volume of permeate that can be passed through a membrane surface per unit of pressure or vacuum applied.

The complex mechanisms behind membrane fouling have been widely studied in recent years.

Membrane fouling is highly influenced by diverse MBR operational parameters such as influent wastewater temperature, membrane aeration frequency factor, membrane aeration flow; permeate flux, permeation duration, backwash flow and duration, relaxation duration, maintenance and recovery chemical cleaning frequencies.

The resistance in series method has been used for membrane fouling quantification and identification of the main fouling mechanism (i.e. pore blocking, cake filtration) at any given set of operational conditions. This method allows for a detailed breakdown and quantification of membrane fouling which makes it possible to identify the causes of membrane fouling.

As it has been previously described, there are several operational alternatives for fouling removal available in MBR such as relaxation, backwash, maintenance and recovery chemical cleaning. The application of each of these methods is aimed at the removal of different kinds of fouling. Relaxation and backwash are designed to mechanically remove the foulants deposited on the membrane surface or loosely inserted into the membrane pores. On the other hand, maintenance and recovery chemical cleaning are meant to chemically remove the foulants deeply adsorbed into the membrane pores and biofilm strongly attached to the membrane surface.

Ideally the decision for the application of any of these different fouling removing methods as well as the remaining MBR operational parameters is preceded by a detailed analysis of the membrane fouling and the identification of the main fouling mechanism. However, this analysis, if done at all, is based on off-line data and takes place sporadically or only during piloting or start up. Currently, MBR process control is limited and lacks flexibility to adjust to the different operational conditions encountered in practice. The operational changes are made manually from off-line data and infrequently, if at all, and are highly dependent on the skill and good judgment of the operator.

SUMMARY

The following summary is intended to introduce the reader to the invention but not define it. The invention may reside in any combination of one or more process steps or apparatus elements selected from the set of every element and step described in any part of this document. The inventors do not waive or disclaim their rights to any invention or inventions disclosed in this specification merely by not describing such other invention or inventions in the claims.

This specification describes an immersed membrane treatment system that uses real-time process information to adjust the instantaneous or time averaged scouring airflow rate or other alterable parameters. A process is also described for adjusting the supply of scouring air to an immersed membrane using process information. Feedback control to the actual air supply equipment can be automatic (via PLC or computer) or manual (for example an operator initiates a change in air delivery rate).

Various tests have been conducted to determine the optimum aeration rate for various applications, e.g. wastewater treatment, direct filtration of surface waters and filtration of waters pretreated with coagulant or other chemicals. These results, or other pilot results, serve as the basis for designing the blower capacities and aeration rates in full-scale systems. It has been successfully demonstrated that, at a particular transmembrane pressure, an increase in aeration rate can result in an increase in permeate flow. Under these conditions, mass transfer through the boundary layer may be rate-limiting. Optimization of the boundary layer thickness through adjustments in airflow provides a method of reducing operating energy requirements.

If the aeration rate is less than the optimum, the mass transfer through the boundary layer can have a significant affect and reduce the permeate output of the system. If the aeration rate is higher than the optimum, energy is being wasted as excess air is being supplied. To maximize production from a system and to minimize operating costs requires control of the aeration rate as process conditions vary.

This specification describes a system or process wherein aeration efficiency is improved to help reduce operating energy and operating cost. Airflow, for example at constant rate or a time averaged rate, is controlled to account for real-time differences in process conditions e.g. permeate flows, feedwater viscosity, inlet air temperature, water temperature or coagulant dosage. This invention enables the control system, with information from process instrumentation, to determine a desired aeration rate or change in aeration rate predicted to improve production or reduce cost. The actual airflow can then be adjusted either automatically by the control system or manually by the operator depending on the installation. The rate adjustment may occur by adjusting the rate of continuous aeration or by adjusting aeration on-off times (cyclic or intermittent aeration), train on/off times or number of trains in operation.

Methods of controlling a system may include one or more of
a) Measuring the performance of the system over a relatively short period of time (e.g. 15 to 60 minutes), comparing those results with baseline values or values from a previous or preceding period of time and using that information to adjust any of the following:
the actual air flow rate delivered to the membrane over a period of time
aeration on/off times when operating in cyclic or intermittent aeration modes
train on/off times
number of trains in operation and design permeate flow per train
b) Obtaining real-time process information and adjusting the airflow rate or other variables listed in a) above based on model data previously incorporated into the control system.
Some processes may be used with all immersed membrane systems, including direct filtration and wastewater systems.

In another aspect, this specification describes an on-line, process control system or method using the resistance in series method, that may be used for operating microfiltration or ultrafiltration immersed MBR or other membrane treatment systems. This process control may consider on-line resistance data in adjusting operational parameters such as membrane aeration frequency factor, membrane aeration flow, permeate flux, permeation duration, backwash flow and duration, relaxation duration, or maintenance or recovery chemical cleaning frequencies in order to optimize the operational costs related to membrane fouling removal. The means to control may be, for example, feedback, feed forward, adaptive or model predictive.

The on-line, process control system consists of sensors, data acquisition, a controller and signal conditioning accessories, if required. The data acquisition and signal conditioning accessories are responsible for collecting and conditioning the system operational data (e.g. permeate temperature, transmembrane pressure and permeate flux, etc) while the controller is in charge of analyzing the stream of on-line operational data using the resistance in series method, calculating control parameters (for example, one or more of $R_a$, $\Delta R_{ab}$ and $R_c$), comparing the obtained results with corresponding set points and making the decision of how to modify the system operational parameters to reduce operational costs related to membrane fouling removal. The operational parameters may be modified on a step wise manner, one at a time, following a control logic that gives priority to those operational changes that produce a significant impact on membrane fouling removal over those that produce a limited effect. The control logic presented below can be modified according to the operational conditions encountered in practice.

For those cases where a value of resistance is larger than an established high limit set point and there is a need to reduce the membrane fouling rate (Fouling Removal mode), a single parameter may be changed, for example membrane aeration flow rate or frequency factor may increase. Alternatively, a control hierarchy may be established including one or more of the following:
1. Switch from relaxation to backwash, if backwash is not the currently used operational mode.
2. Increase backwash flow rate.
3. Reduce the permeate flux by turning on membrane trains.
4. Increase the membrane aeration flow rate.
5. Increase the membrane aeration frequency factor.

6. Add activated sludge filterability enhancer such as a polymer or ferric chloride.
7. Increase to maximum available aeration frequency factor.
8. Increase the maintenance chemical cleaning frequency.
9. Increase the recovery chemical cleaning frequency.

For those cases where stable operational conditions have been reached and the value of every measured resistance is equal or less than an established low limit set point, there is an opportunity to decrease system operational costs (Energy Savings mode). A single parameter may be altered, for example membrane aeration flow rate or frequency factor may decrease. Alternatively, a control hierarchy may be established as follows:

1. Decrease aeration frequency factor from its maximum available value.
2. Stop the addition of activated sludge filterability enhancer.
3. Decrease the membrane aeration frequency factor.
4. Decrease the membrane aeration flow rate.
5. Increase the permeate flux by turning off membrane trains.
6. Decrease backwash flow, if backwash is the currently used operational mode.
7. Switch from backwash to relaxation, if relaxation is not the currently used operational mode.
8. Decrease the maintenance chemical cleaning frequency.
9. Decrease the recovery chemical cleaning frequency.

Changing these parameters can be done, for example, by an incremental or predicted effective amount within a range of values permitted by the system. Optionally, each element of the control hierarchy may have 2 or more discrete states. The states differ in their effectiveness against fouling. To reduce fouling or fouling rates, the control hierarchy may move one or more controlled parameters to the more effective state starting from the top of the hierarchy until acceptable operational conditions, for example as determined by comparing one or more resistance values to one or more set points, are achieved. To provide an energy savings, the control hierarchy may move one or more parameters to a less effective state starting at the top of the hierarchy until the desired performance is achieved. While some parameters may optionally be infinitely variable, the inventors have found that many parameters have only very small ranges in which they are variable in a real system and providing two or more discrete states may provide more effective control. Air scouring, for example, is surprisingly difficult to vary. Air blowers that feed aerators tend to operate efficiently only in a small range of speeds. Aerators also sludge up or produce poorly sized bubbles if feed air flow rate is outside a narrow range. However, A.F.F. can be varied, for example between two discrete states such as 0.5 and 0.25, by changing the operation of a valve set and turning one or more of a set of blowers on or off, for example turning half of the blowers off when A.F.F. is changed from 0.5 to 0.25. The two states differ markedly in effect on fouling but blowers and aerators can operate well in both states. A control hierarchy may have more or less parameters than the hierarchy described above, and the parameters may be in other orders. Where a parameter in the hierarchy does not have discrete states, its value may be changed to an upper or lower limit before moving to the next parameter in the hierarchy.

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors and owners reserve all rights in any invention disclosed in an apparatus or process described below that is not claimed in this document and do not abandon, disclaim or dedicate to the public any such invention by its disclosure in this document.

Figure 1:
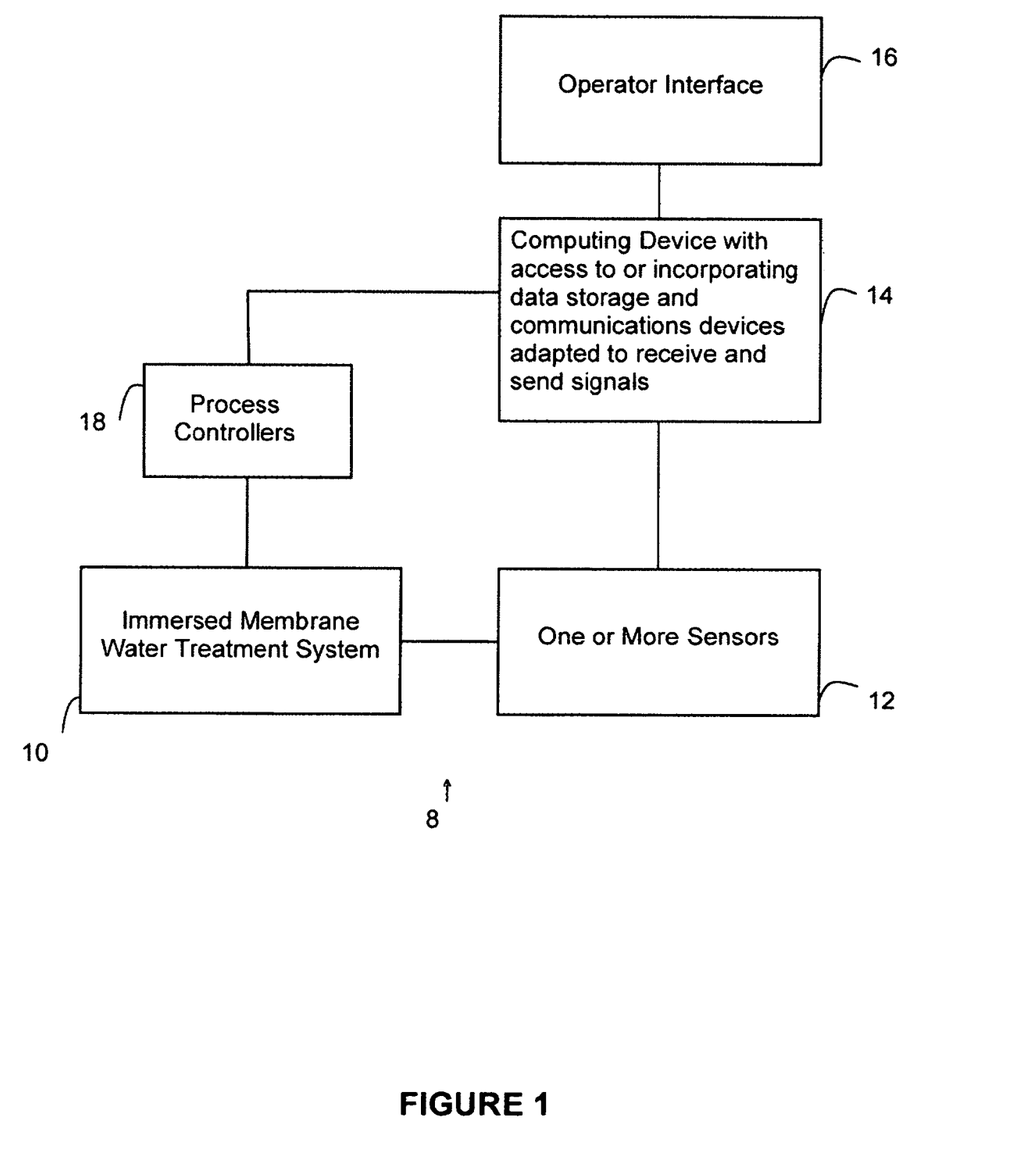
FIG. 1 is a schematic representation of an immersed membrane treatment system with a control system according to an embodiment of the invention or adapted to carry out a process according to the invention.

Referring to FIG. 1, a system 8 includes an immersed membrane water treatment system 10 which is connected to one or more sensors 12 which provide input information to a computer 14 and optionally to an operator through an operator interface 16. The specific process inputs provided by the sensors 12 can include one or more of the following:

Permeate flow
Reject or concentrate flowrate
Sludge filterability
Fluid temperature
Fluid viscosity
Fluid suspended solids concentration
Coagulant or other pretreatment chemical addition rate
Activated carbon dosage rate or concentration
Blower inlet air temperature
Recovery rate (permeate produced/feedwater provided)
Dissolved oxygen concentration (wastewater systems)
Oxygen uptake rate (wastewater systems)
Solids retention time (wastewater systems)
Mixed liquor recirculation rates (wastewater systems)

After considering the information from the sensors 12, the computer 14, after running its own programs or as instructed by an operator through the interface 16, instructs process controllers 18 to adjust the aeration regime of the system 10.

The methods or step which the process controllers 18 may program may be one or more of:
  a. Adjustments to the airflow rate (continuous, cyclic or intermittent)
    Example: reduce instantaneous airflow from 0.35 m$^3$/h–m$^2$ to 0.30 m$^3$/h–m$^2$
  b. Adjustments to the on and off aeration times during cyclic or intermittent aeration cycle,
    Examples: change cyclic aeration times from "10 seconds on/10 seconds off" to "10 seconds on/20 seconds off"; or change intermittent aeration times from "1 minute every 30 minutes" to "1 minute every 45 minutes"
  c. Adjustments to the on and off production times for an individual train, or
    Example: change from "18 hours on/6 hours off" to "3 hours on/1 hour off"

d. Adjustments to the number of trains in operation or design permeate flow for each train as part of a complete system.

Example: change from 2 systems operating at a higher flux to 3 systems operating at a lower flux (for example when filterability of sludge changes)

Methods by which the sensors 12 may be used to collect real-time process measurements that can be used to determine changes in the aeration regime may include one or more of the following:

A method may involve steps of testing, evaluating results and then optimizing. For example, process controllers 18 may operate to provide a fixed aeration rate for a period of time to establish baseline process operating conditions (including flux, transmembrane pressure). This baseline data may be conducted, for example over 4 to 8 filtration cycles, approximately 2 hrs. The system 8 would then automatically conduct a test on one or more of the trains. In this test, it would maintain the same permeate production flow but adjust the aeration rate upward or downward by a certain percentage, e.g. 5%, for as many filtration cycles as necessary to obtain steady state performance. The system 8 would monitor the process conditions (in particular TMP and fouling rate) and would be able to determine when steady state conditions are achieved. Since the development of the new boundary layer is expected to be extremely fast, steady state is expected to be 2 or 3 filtration cycles. The specific process conditions will be evaluated by the system 8 to determine if the change has affected aeration efficiency. Knowing the efficiency of the blowers and the permeate pumps, the system 8 can determine if the new aeration rate yields better performance in terms of either simple permeate flow or total energy efficiency (flowrate per unit energy input). If a decrease in blower output does not change the permeation TMP, it can be concluded that the aeration rate was in excess of that necessary to remove the suspended solids loaded on to the membrane. If a decrease in aeration rate results in an increase in TMP, then the control system can quantify the changes in operating costs and assess if the change was positive or negative. Once the analysis of the results is complete, the system can conduct a similar test at a new aeration rate. This test may be repeated until the optimum aeration rate has been determined.

The system would continue to operate at the set aeration rate until changes in process operating conditions were noted e.g. an increase in the permeate flow setpoint would result in the optimization tests being repeated. Optimization tests could also be triggered based on a time interval (e.g. every 6 hours or once a day) or whenever initiated by the operator (e.g. after sludge wasting has occurred).

In a method using an on-line filterability test, a train of membrane filters is operated under controlled conditions for a short period of time to test the filterability of the fluid being filtered. The test consists of three steps:

1. Stop membrane permeation but continue aeration for a period of 30 seconds to 5 minutes. The purpose of this step is to deconcentrate the liquid surrounding the membranes and to reduce the boundary layer thickness to a baseline level.
2. Stop aeration and start permeation of the membrane filters at a specified membrane flux for a period of 30 seconds to 20 minutes. During this time, the transmembrane pressure will rise due to the redevelopment of the boundary layer at the surface of the membrane filters. The purpose of this step is to develop a relationship between transmembrane pressure and time. This relationship can be correlated to an optimum aeration rate.
3. Stop membrane permeation and resume aeration for a period of 30 seconds to 5 minutes. The purpose is to remove the solids that accumulated on the membranes during step 2.
4. Based on the results of the test, and comparing the results with previously input model results, adjust aeration rate or operating strategy (refer to methods a) to d) described above and the train is ready to operate under new optimized conditions.

In a process parameter modeling method, the control system would use real-time data to determine the membrane system operating conditions and based on those conditions and previously input models, would set the aeration flow or system operating strategy accordingly. The optimization can be as simple as tracking a single parameter (e.g. as permeate flow increases, so does aeration rate) or as many parameters as is necessary can be used. For example, in wastewater treatment systems, the optimum aeration rate could be a function of the sludge filterability and permeate flowrate. A model is first developed and the data incorporated into the system 8. The models necessary will depend on each application and the parameters that can be expected to change with operation. Another example would be if the sludge filterability is good, 2 trains can be operated at a higher flow and when the sludge filterability is low, three trains can be operated at proportionately lower flows.

A method may use measured or calculated resistance data, for example one or more of the resistance parameters in the resistance in series model. The resistance in series model represents the total resistance to filtration as the combination of a number of independent resistances. Resistance values may be used in, for example, feedback, feed forward, adaptive or model predictive control processes.

$$R_t = R_m + R_a + R_b + R_c$$

$R_t$ is the total resistance, $m^{-1}$ $R_m$ is the membrane resistance, $m^{-1}$ as represented by the membrane clean water test $R_a$ is the adsorptive fouling resistance, caused by fouling agents adsorbed on the surface and in the porous structure of the membrane.

$R_b$ is the pore blocking resistance, $m^{-1}$, caused by colloidal matter and micro particles that are comparable in size to the membrane pore size. This is normally represented by a rapid rise in transmembrane pressure immediately following a backwash.

$R_c$ is the cake resistance, $m^{-1}$ which progressively increases between two backwash cycles as the cake builds up on the membrane surface.

For this particular application, the value of $R_m$ is considered as constant and can be obtained from a clean water test. The resistance during backwash ($R_{db}$) will be used to calculate the adsorptive fouling resistance $R_a$ and the membrane resistance as follows:

$$R_a = R_{db} * f - R_m$$

Where f is a factor that relates resistance during permeation to the resistance during backwash.

The cake resistance ($R_c$) will be estimated by performing a linear regression for those experimental data of a given permeation cycle that corresponds to the permeation mode and comply with one or more of the following conditions, called Valid Permeation Cycle (VPC) conditions.

$$J = J_{setpoint} \pm 35\%;$$

where $J_{setpoint}$ is the permeate pump set point. Alternate or additional criteria may also be used for VPC conditions. For example, the VPC conditions may be that $J=J_{setpoint} \pm 35\%$ and $dR_t/dT<5\%$ for 5 consecutive samples. $dR_t/dT$ is the rate of increase of total resistance in time during permeation and it is calculated as:

$$dR_t/dT=(R_{n+1}-R_n)/(T_{n+1}-T_n)$$

Where $R_n$ and $R_{n+1}$ are two consecutive total resistance data points of any given permeation cycle and $T_n$ and $T_{n+1}$ are the corresponding permeation times.

Then the cake resistance will be calculated using the experimental data that complies with the above illustrated conditions.

$$R_c=M(T_2-T_1)$$

Where M is the slope of the linear regression; $T_1$ and $T_2$ are the starting and ending times of the permeation cycle; respectively.

The pore blocking resistance will be estimated as follows:

$$R_b=R_{ab}*e-R_m$$

Where e is the cake removal efficiency and represents the amount of cake remaining on the membrane surface after the application of relaxation or backwash and is a function of the cake stickiness and the operational conditions of the relaxation or backwash. $R_{ab}$ is the resistance after backwash and is determined by the average of the first five samples of a permeation cycle that meet the VPC condition as outlined in the cake resistance calculation.

$$R_{ab}=(R_{t1}+R_{t2}+R_{t3}+R_{t4}+R_{t5})/5$$

The first step in the control strategy involves the calculation of the filtration resistances during operation at permeation mode using on-line MBR operational data, in a similar fashion as described above.

The calculation of the resistance after backwash ($R_{ab}$), resistance after backwash increase rate ($\Delta R_b$) and cake filtration ($R_c$) resistances is of particular interest for the adjustment of the value of the membrane aeration frequency factor, membrane aeration flow, relaxation cycle duration, permeation cycle duration, backwash flow, backwash duration to reduce the membrane fouling rate, using an on-line process control. The calculation procedure is as follows:

Measure TMP, Permeate Flux, Temperature and Time for two consecutive permeation and backwash or relaxation cycles.

Calculate $\Delta R_{ab}$ and $R_c$ for any given permeation cycle as follows:
i. $\Delta R_{ab}=R_{ab}(\text{cycle 2})-R_{ab}(\text{cycle 1})$
ii. $R_c=M(T_2-T_1)$ Compare $\Delta R_{ab}$ and $R_c$ values with their corresponding set points (Table 1.0) to adjust the value of the membrane aeration frequency factor, membrane aeration flow, relaxation cycle duration, permeation cycle duration, backwash flow and duration, maintenance and recovery clean frequencies so as to minimize the energy required for membrane fouling removal. The corresponding operational changes may be performed every cycle, if needed.

The calculation of the adsorptive resistance ($R_a$) is optional but may be of particular interest for the adjustment of the value of the maintenance and recovery chemical cleaning frequencies using an on-line process control, if desired. However, calculation of $R_a$ may also be omitted if chemical cleaning procedures will not be controlled. The calculation procedure is as follows:

1. Initiate a filtration cycle (1) followed by backwash period followed by another filtration cycle (2). In those cases where relaxation is used as the mechanism for cake removal it would be required to switch to backpulse mode after a number of cycles in order to collect the information needed to estimate the membrane condition.

2. Measure TMP, Permeate Flux, Temperature and Time for two consecutive filtration and backwash cycles.

3. Calculate ($R_a$) as follows:

($R_a$)=resistance during backwash (cycle 2)−resistance during backwash (cycle 1)

4. Compare ($R_a$) values with its corresponding set point to adjust the value of the maintenance and recovery chemical cleaning frequencies as to minimize the energy required for membrane fouling removal. The corresponding operational changes will be performed after five cycles, if needed.

Two different groups of set points may be established for a particular system; sustainable and optimized. The values of these set points might change for different treatment plants as they take into account different operational variables (e.g. mixed liquor characteristics, wastewater temperature) that are known to be site related. The set points may be determined during piloting of a system or based on historical system performance. One or more of the set points may also vary with time. The different resistances that are being monitored, for example $\Delta R_{ab}$ and $R_c$, will be compared against their respective set points in order to perform the adequate operational changes. The calculated resistances may be single values or a composite of several values spaced in time, for example as obtained by a mathematical averaging or regression.

The sustainable set point represents the maximum value of resistance at which the system should be operated. When any of the values of the resistances being monitored are higher than any of the corresponding sustainable set points (Red Zone); only those operational changes will be made that ensure that a reduction in the membrane fouling is achieved (Fouling Removal mode).

On the other hand, the optimized set point is the maximum value for which operational changes to achieve energy savings are possible; when any of the values of the resistances being monitored are between the sustainable and the optimized set point (Yellow Zone), no change of the operational parameters will be performed. When all of the values of the resistances being monitored are lower than the values of the corresponding optimized set point (Green Zone), then it is possible to execute operational changes that lead to energy savings (Energy Savings mode).

If one of the set points is exceeded, then the system will be considered to be operating at the zone corresponding to that set point. The two set points enhance the stability of the process, help avoid switching system operations too frequently or in response to errant resistance measurements and allow for operation for extended periods of time within a range between the two set points. However, a single set point can be used if the process is otherwise dampened. For example, more robust regression algorithms can be used on the calculated resistances, a mathematical band may be constructed around the set point, the sampling rate may be decreased, the calculated resistances may be required to be above or below the set point at multiple sampling periods or other techniques or combinations of techniques can be used to dampen the system.

Figure 2:
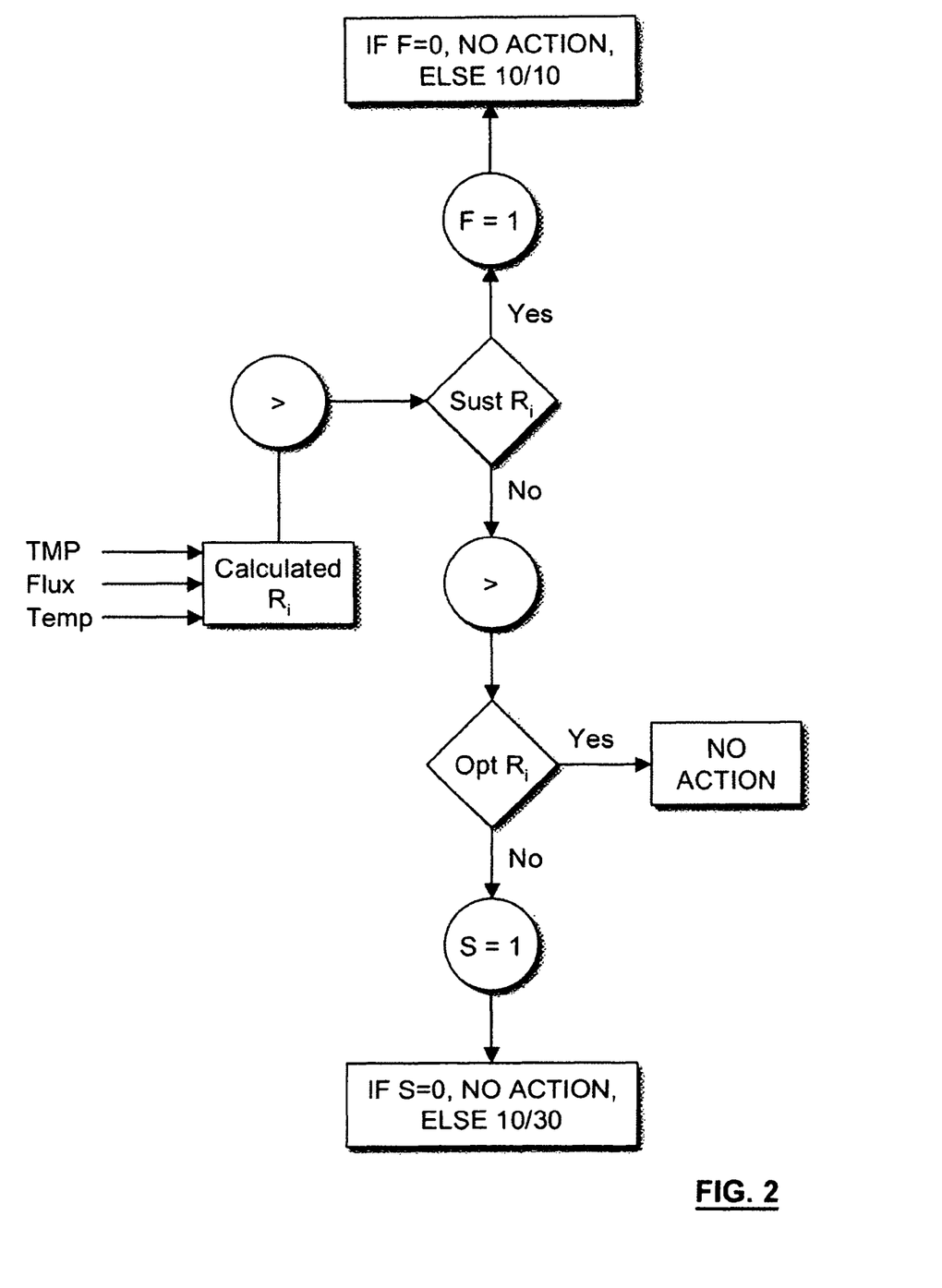
FIG. 2 is a decision tree for a control system.
Figure 3:
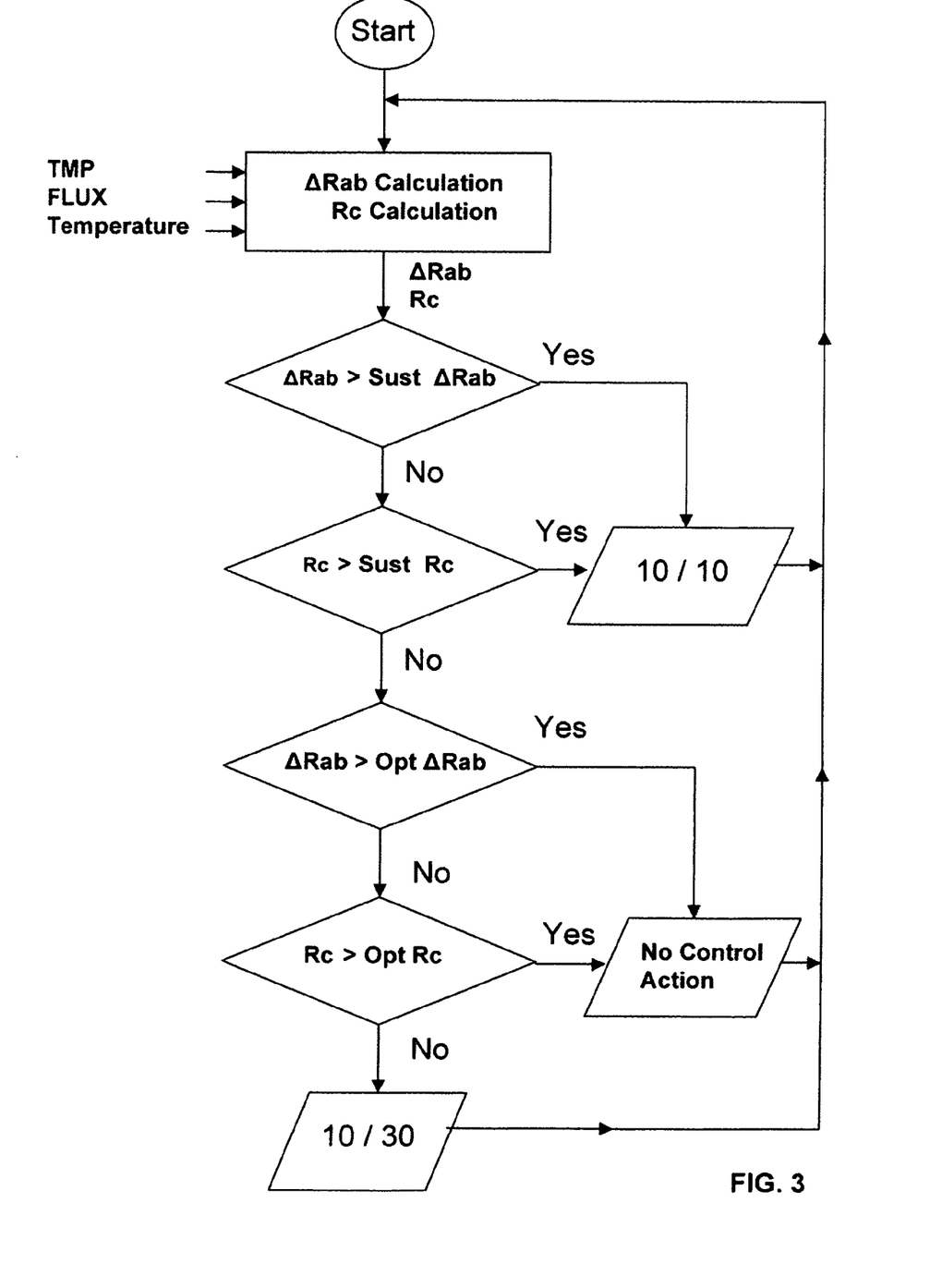
FIG. 3 is another decision tree for a control system.
Figure 5:
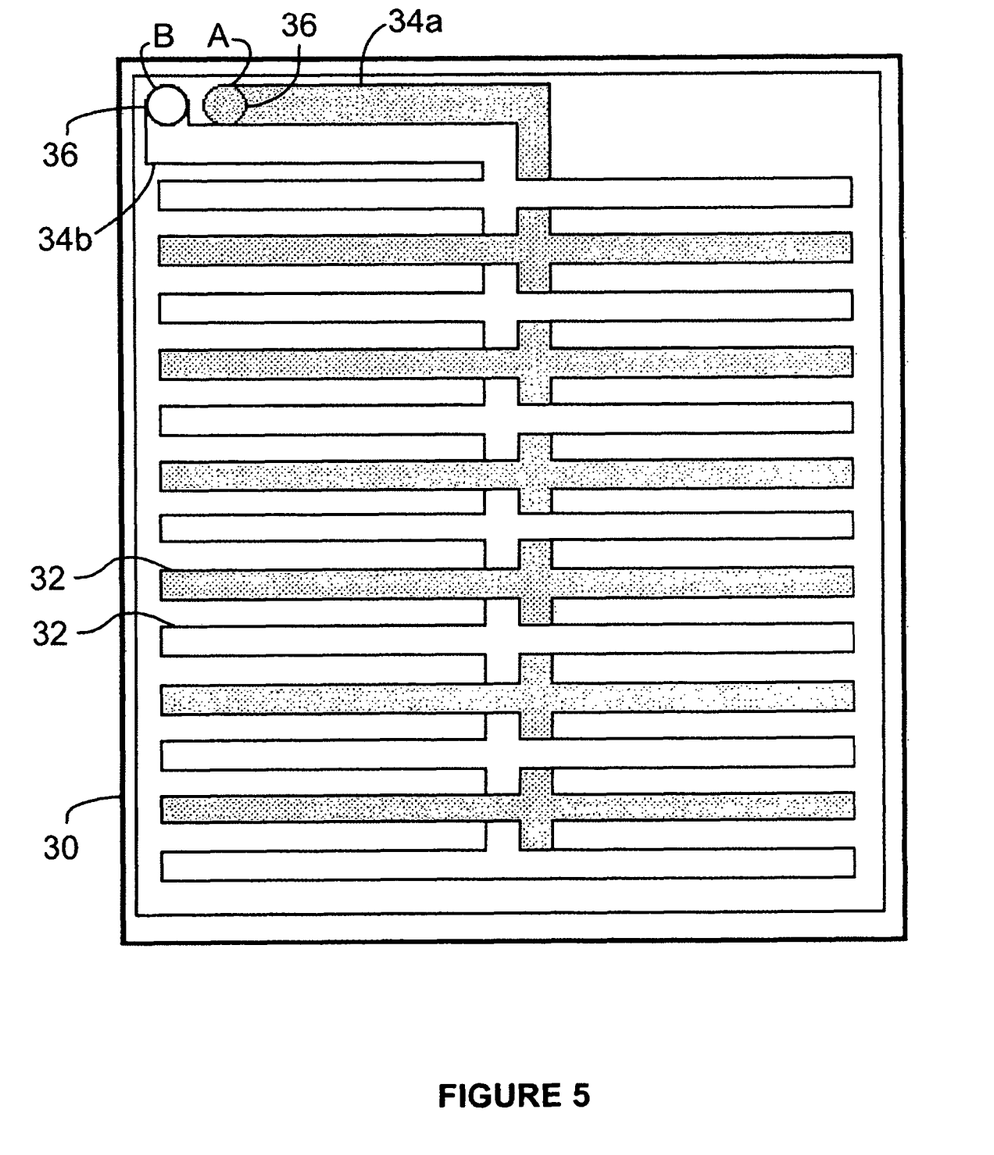
FIG. 5 is a schematic plan view of a membrane tank showing the arrangement of aerators.
Figure 6:
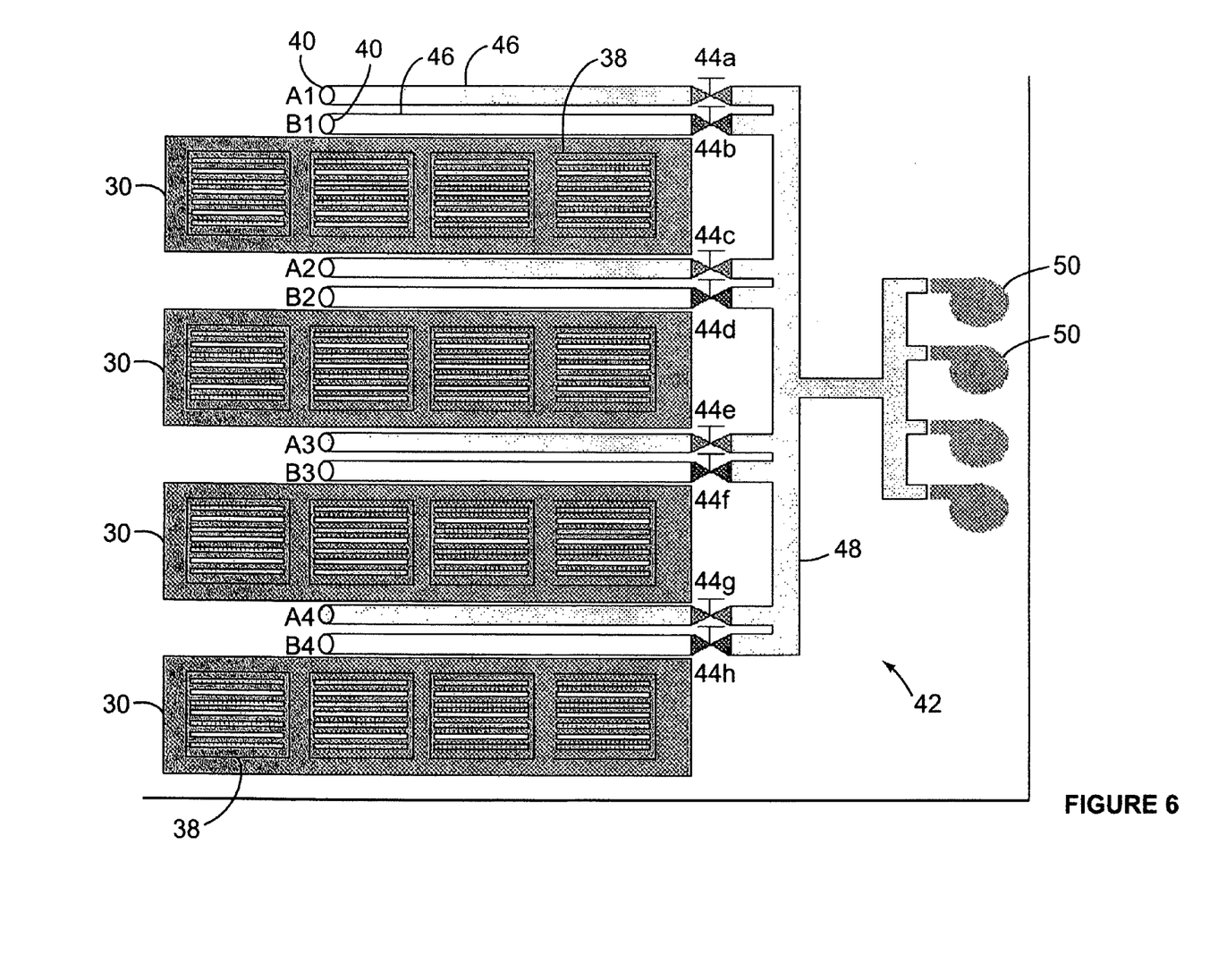
FIG. 6 is a schematic drawing of parts of an air supply system.

FIGS. 2 and 3 show decision trees for systems having a single parameter, A.F.F., adjustable between two operational states. The two states are 10 seconds on 10 seconds off and 10 seconds on 30 seconds off. In the 10/10 cycle, a number of air blowers are used and the total air supply is cycled between two halves of a number of aerators. In the 10/30 cycle, half of the air blowers are turned off and the total air is cycled between four quarters of the number of aerators. For example, FIG. 5 shows a membrane tank 30 having several conduit aerators 32 each connected to one of two tank manifolds 34 running along the bottom of the tank 30. Tank manifold 34a delivers air to one half of aerators 32 while tank manifold 34b delivers air to the other half of aerators 32. Drop legs 36 extend upwards from tank manifolds 34 and allow air to be fed from above the tank 30 to the grid of aerators 32. Referring to FIG. 6, 4 tanks 30 each contain a number of immersed membrane cassettes 38 placed over the grid of aerators 32. The cassettes 38 are connected together for permeate removal and may be called a train. Aerators 32, tank manifolds 34 and drop legs 36 are not shown in FIG. 6 but are also present in each tank 30 of FIG. 6 as shown in FIG. 5. The drop legs 36 from each tank 30 connect to connectors 40 of supply system 42. Supply system 42 further includes a set of valves 44 in pipes 46 between connectors 40 and a plant manifold 48. Plant manifold 48 is connected to four blowers 50. Valves 44 are powered by solenoids of fluidic actuators and connected to process controllers 18. During 10/10 aeration, all four blowers 50 are on, and valves 44 are controlled such that valves 44a,c,e,g are open for 10 seconds while valves 44b,d, f,h are closed then valves 44a,c,e,g are closed for 10 seconds while valves 44b,d,f,h are open. This cycle is repeated for as long as the 10/10 cycle is requested. Thus, each cassette always has a flow of air to it, but the flow switches between aerators 32 connected to the different tank manifolds 34. When a 10/30 cycle is requested, two trains are linked such that air flow is alternated between the two tank manifolds 34 in each tank 30 and between the two tanks 30, that is between four tank manifolds 34 in two tanks 30. Thus each cassette 38 experiences a 10 seconds on 10 seconds off aeration pattern but with the source of air in consecutive air on periods alternating between the two sets of aerators 32 in that tank 30. Each aerator 32 has a 10 seconds on 30 seconds off pattern. In greater detail, for 10 seconds valves 44a,e are open while the others are closed. For the next 10 seconds, valves 44c,g are open while the others are closed. For the next 10 seconds, valves 44b,f are open while the others are closed. For the next 10 seconds, valves 44d,h are open while the others are closed. This pattern is repeated for as long as 10/30 aerations is requested. Other methods of reducing a time and space averaged air flow without reducing instantaneous flow to individual aerators might also be used. For example, in a system where air is supplied continuously or cyclically or intermittently from a set of blowers to a set of aerators, half of the blowers may be turned off and a valve closed to isolate half of the aerators. Although the discussion above describes two or three types of resistance values, one, two, three or more than three resistance values may be used. For example, in the system of FIG. 2, cake resistance may be the only parameter used since it is closely related to air scouring.

EXAMPLES

Example 1

In a 2 month test period the application of an on-line MBR process control, based on the results from the resistance in series method was studied. This on-line MBR process control will adjust different operational parameters (e.g. membrane aeration frequency factor, relaxation duration, etc.) to reduce the MBR operational costs or increase membrane fouling removal, as required.

A ZeeWeed® immersed membrane pilot plant, made by ZENON Environmental Inc, was operated using raw wastewater feed from a municipal water pollution control centre. The raw wastewater was screened through a 0.75 mm screen. The pilots were operated at a hydraulic retention time of 6 hours and a sludge retention time of 15 days.

At the first set of conditions that lasted 2 days, ZeeWeed® membranes were operated for a 10 minute permeation cycle with a net flux of 14 gallons/(square foot*day) (gfd), a corresponding instantaneous flux of 15.4 gfd and 1 minute relaxation time. The systems were operated at a mixed liquor suspended solids concentration of around 10 g/l.

The membrane aeration frequency factor was set at 0.25 (10 seconds on and 30 second off) during permeation and relaxation; a coarse air bubble flow rate of 8 scfm per gap was used. The bioreactor was aerated using fine bubble aerators. Mixed liquor was recirculated from the bioreactor to the membrane tank by a pump and was returned to the bioreactor by gravity. Sludge was wasted on intermittent basis to maintain a steady sludge retention time.

A detailed analysis of the characteristics of this MBR system allowed for the identification of the corresponding on-line MBR process control set points for this system; these are presented in Table 1.0. The yellow zone is an operation zone between the red zone and the green zone although it has no distinct operation mode name or parameters.

TABLE 1.0

Set points of the MBR on-line process control.

| Operation zone | Set point | Operation mode | $\Delta R_{ab}$ | $R_c$ | $R_a$ |
|---|---|---|---|---|---|
| Red | Sustainable | Fouling Removal | $2*10^8$ | $8*10^{11}$ | $2*10^8$ |
| Green | Optimized | Energy Savings | $1*10^8$ | $6*10^{11}$ | $1*10^8$ |

Tables 1.1 and 1.2 contain some of the operational data corresponding to two consecutive permeation cycles of operation under the above described operational conditions. These operational data will be used to describe the resistance calculations.

TABLE 1.1

Permeation cycle 1 experimental data (experimental conditions 1).

| Time | FLUX (gfd) | TMP (psi) | Temp (° C.) | μ | Rt (m$^{-1}$) | dR/dT |
|---|---|---|---|---|---|---|
| 08:50:41 | 0.0 | 0.04 | 12.73 | 0.0 | N/A | N/A |
| 08:50:46 | 0.0 | 0.02 | 12.73 | 0.0 | N/A | N/A |
| 08:50:51 | 0.0 | 0.03 | 12.72 | 0.0 | N/A | N/A |
| 08:50:56 | 0.0 | 0.03 | 12.72 | 0.0 | N/A | N/A |
| 08:51:01 | 0.0 | 0.03 | 12.68 | 0.0 | N/A | N/A |
| 08:51:07 | 0.0 | 0.03 | 12.69 | 0.0 | N/A | N/A |
| 08:51:12 | 0.0 | 0.03 | 12.69 | 0.0 | N/A | N/A |
| 08:51:17 | 0.0 | 0.01 | 12.70 | 0.0 | N/A | N/A |
| 08:51:22 | 0.0 | −0.07 | 12.71 | 0.0 | N/A | N/A |
| 08:51:27 | 0.0 | 0.02 | 12.72 | 0.0 | N/A | N/A |
| 08:51:32 | 0.0 | −0.02 | 12.74 | 0.0 | N/A | N/A |
| 08:51:37 | 0.0 | 0.84 | 12.73 | 0.0 | N/A | N/A |
| 08:51:42 | 8 | 1.39 | 12.72 | 0.0 | 2.57E+12 | 6 |
| 08:51:47 | 15.5 | 2.90 | 12.70 | 0.0 | 2.73E+12 | 2 |
| 08:51:52 | 15.6 | 2.96 | 12.71 | 0.0 | 2.79E+12 | 0 |
| 08:51:57 | 15.5 | 2.99 | 12.70 | 0.0 | 2.79E+12 | 1 |
| 08:52:02 | 15.7 | 2.99 | 12.69 | 0.0 | 2.81E+12 | 1 |
| 08:52:07 | 15.6 | 3.01 | 12.68 | 0.0 | 2.83E+12 | 0 |
| 08:52:12 | 15.7 | 3.02 | 12.70 | 0.0 | 2.83E+12 | −1 |
| 08:52:17 | 15.7 | 3.03 | 12.71 | 0.0 | 2.81E+12 | 0 |
| 08:52:22 | 15.4 | 3.03 | 12.72 | 0.0 | 2.79E+12 | 1 |
| 08:52:27 | 15.5 | 3.00 | 12.71 | 0.0 | 2.83E+12 | 0 |

TABLE 1.2

Permeation cycle 2 experimental data (experimental conditions 1).

| Time | FLUX (gfd) | TMP (psi) | Temp (° C.) | μ | Rt (m⁻¹) | dR/dT |
|---|---|---|---|---|---|---|
| 09:01:42 | 0.000 | 0.09 | 12.65 | 0.001 | N/A | N/A |
| 09:01:47 | 0.000 | 0.06 | 12.64 | 0.001 | N/A | N/A |
| 09:01:52 | 0.000 | 0.04 | 12.63 | 0.001 | N/A | N/A |
| 09:01:57 | 0.000 | 0.05 | 12.62 | 0.001 | N/A | N/A |
| 09:02:02 | 0.000 | 0.04 | 12.63 | 0.001 | N/A | N/A |
| 09:02:07 | 0.000 | 0.04 | 12.63 | 0.001 | N/A | N/A |
| 09:02:12 | 0.000 | 0.16 | 12.64 | 0.001 | N/A | N/A |
| 09:02:17 | 0.000 | 0.03 | 12.65 | 0.001 | N/A | N/A |
| 09:02:22 | 0.000 | −0.01 | 12.66 | 0.001 | N/A | N/A |
| 09:02:27 | 0.000 | 0.02 | 12.65 | 0.001 | N/A | N/A |
| 09:02:32 | 0.000 | 0.02 | 12.65 | 0.001 | N/A | N/A |
| 09:02:37 | 0.000 | 0.02 | 12.64 | 0.001 | N/A | N/A |
| 09:02:42 | 4.753 | 0.77 | 12.64 | 0.001 | 2.37E+12 | 15 |
| 09:02:48 | 9.888 | 1.89 | 12.64 | 0.001 | 2.80E+12 | 1 |
| 09:02:53 | 15.777 | 3.03 | 12.63 | 0.001 | 2.83E+12 | 2 |
| 09:02:58 | 15.550 | 3.08 | 12.64 | 0.001 | 2.90E+12 | 3 |
| 09:03:03 | 15.410 | 3.20 | 12.64 | 0.001 | 2.97E+12 | 0 |
| 09:03:08 | 15.498 | 3.09 | 12.65 | 0.001 | 2.98E+12 | −5 |
| 09:03:13 | 15.593 | 3.09 | 12.66 | 0.001 | 2.84E+12 | 2 |
| 09:03:18 | 15.601 | 3.06 | 12.66 | 0.001 | 2.89E+12 | 0 |
| 09:03:23 | 15.667 | 3.10 | 12.65 | 0.001 | 2.89E+12 | 1 |
| 09:03:28 | 15.550 | 3.12 | 12.64 | 0.001 | 2.93E+12 | 0 |
| 09:03:33 | 15.615 | 3.13 | 12.64 | 0.001 | 2.93E+12 | 2 |
| 09:03:38 | 15.396 | 3.13 | 12.64 | 0.001 | 2.99E+12 | 0 |

The operational data corresponding to these conditions was used to calculate the different relevant resistances.

As mentioned above, the resistance after backwash will be calculated based on the average of the first five values that comply with the valid permeation cycle conditions. The adsorptive fouling resistance was not calculated in the following examples.

As it can be observed from the presented table, for the first permeation cycle, the values prior to 8:51:47 do not meet the VPC conditions and consequently cannot be used for this calculation. The values corresponding from 8:51:47 to 8:52:07 are the first five values that comply with these conditions. For the second permeation cycle the same procedure is used. The value of $R_{ab}$ is calculated as follows:

$$R_{ab}(\text{cycle 1}) = (2.73 \times 10^{12} + 2 \times 2.79 \times 10^{12} + 2.81 \times 10^{12} + 2.83 \times 10^{12})/5 = 2.79 \times 10^{12}\ m^{-1}$$

$$R_{ab}(\text{cycle 2}) = (2.80 \times 10^{12} + 2.83 \times 10^{12} + 2.90 \times 10^{12} + 2.97 \times 10^{12} + 2.98 \times 10^{12})/5 = 2.89 \times 10^{12}\ m^{-1}$$

$$\Delta R_{ab} = R_{ab}(\text{cycle 2}) - R_{ab}(\text{cycle 1}) = 2.89 \times 10^{12} - 2.79 \times 10^{12} = 1.0 \times 10^{11}\ m^{-1}$$

As it has been previously established, $R_c$ can be estimated as follows:

$$R_c = M(T_2 - T_1)$$

After performing the linear regression the value of the slope M was determined:

$$M = 1.18 \times 10^{11}\ m^{-1}/\text{min}$$

$$R_c = 1.18 \times 10^{11}\ m^{-1}/\text{min} \times (9.99\ \text{min}) = 1.17 \times 10^{12}\ m^{-1}$$

From the analysis of the calculated resistances it can be concluded that the values of $\Delta R_{ab}$ and $R_c$ are both higher than the corresponding sustainable set points, which means that the system is operating at the Red Zone and the application of the Fouling Removal mode is needed to avoid any slugging of the membrane modules.

Following the established control hierarchy for the Fouling Removal mode, the aeration frequency factor was increased from 0.25 (10 on/30 off) to 0.5 (10 on/10 off) while maintaining the remaining operational parameters constant. Immediately after the change in aeration frequency factor, the operational data corresponding to these new operational conditions was used to calculate the different relevant resistances to assess the effectiveness of these measures on fouling removal. The procedure is the same as done previously.

Tables 1.3 and 1.4 contain some of the operational data corresponding to two consecutive permeation cycles performed on the Energy Savings mode using an aeration frequency factor of 0.25. These operational data will be used to describe the resistance calculations.

TABLE 1.3

Permeation cycle 1 experimental data (experimental conditions 2).

| Time | FLUX (gfd) | TMP (psi) | Temp (° C.) | μ | Rt (m⁻¹) | dR/dT |
|---|---|---|---|---|---|---|
| 00:05:42 | 0 | 0.016 | 14.256 | 0.001 | N/A | N/A |
| 00:05:47 | 0 | −0.109 | 14.260 | 0.001 | N/A | N/A |
| 00:05:52 | 0 | 0.003 | 14.244 | 0.001 | N/A | N/A |
| 00:05:57 | 0 | 0.011 | 14.240 | 0.001 | N/A | N/A |
| 00:06:02 | 0 | 0.019 | 14.214 | 0.001 | N/A | N/A |
| 00:06:07 | 0 | −0.109 | 14.206 | 0.001 | N/A | N/A |
| 00:06:12 | 0 | 0.003 | 14.191 | 0.001 | N/A | N/A |
| 00:06:17 | 0 | 0.011 | 14.176 | 0.001 | N/A | N/A |
| 00:06:22 | 0 | −0.006 | 14.160 | 0.001 | N/A | N/A |
| 00:06:27 | 0 | −0.029 | 14.149 | 0.001 | N/A | N/A |
| 00:06:32 | 0 | −0.001 | 14.160 | 0.001 | N/A | N/A |
| 00:06:37 | 0 | 0.005 | 14.153 | 0.001 | N/A | N/A |
| 00:06:42 | 6.350 | 0.850 | 14.157 | 0.001 | 1.940E+12 | −1.68 |
| 00:06:47 | 14.466 | 1.886 | 14.157 | 0.001 | 1.908E+12 | −3.77 |
| 00:06:52 | 15.117 | 1.900 | 14.160 | 0.001 | 1.839E+12 | 0.29 |
| 00:06:57 | 15.154 | 1.910 | 14.153 | 0.001 | 1.844E+12 | −0.46 |
| 00:07:02 | 15.264 | 1.920 | 14.153 | 0.001 | 1.836E+12 | 1.37 |
| 00:07:07 | 15.117 | 1.921 | 14.153 | 0.001 | 1.861E+12 | −0.01 |
| 00:07:12 | 15.147 | 1.929 | 14.157 | 0.001 | 1.861E+12 | −0.01 |
| 00:07:17 | 15.213 | 1.930 | 14.179 | 0.001 | 1.861E+12 | −1.11 |
| 00:07:22 | 15.271 | 1.919 | 14.199 | 0.001 | 1.840E+12 | 1.21 |
| 00:07:28 | 15.227 | 1.936 | 14.210 | 0.001 | 1.863E+12 | −0.78 |

TABLE 1.4

Permeation cycle 2 experimental data (experimental conditions 2).

| Time | FLUX (gfd) | TMP (psi) | Temp (° C.) | μ | Rt (m⁻¹) | dR/dT |
|---|---|---|---|---|---|---|
| 00:16:47 | 0.000 | 0.011 | 14.286 | 0.001 | N/A | N/A |
| 00:16:52 | 0.000 | −0.037 | 14.275 | 0.001 | N/A | N/A |
| 00:16:57 | 0.000 | 0.007 | 14.267 | 0.001 | N/A | N/A |
| 00:17:02 | 0.000 | 0.035 | 14.256 | 0.001 | N/A | N/A |
| 00:17:07 | 0.000 | 0.008 | 14.233 | 0.001 | N/A | N/A |
| 00:17:12 | 0.000 | 0.042 | 14.221 | 0.001 | N/A | N/A |
| 00:17:17 | 0.000 | 0.004 | 14.210 | 0.001 | N/A | N/A |
| 00:17:22 | 0.000 | −0.023 | 14.199 | 0.001 | N/A | N/A |
| 00:17:27 | 0.000 | 0.002 | 14.172 | 0.001 | N/A | N/A |
| 00:17:32 | 0.000 | −0.011 | 14.172 | 0.001 | N/A | N/A |
| 00:17:37 | 0.000 | 0.007 | 14.172 | 0.001 | N/A | N/A |
| 00:17:42 | 0.000 | 0.777 | 14.153 | 0.001 | N/A | N/A |
| 00:17:47 | 7.398 | 1.020 | 14.160 | 0.001 | 1.987E+12 | −7.99 |
| 00:17:52 | 15.073 | 1.893 | 14.172 | 0.001 | 1.840E+12 | 0.75 |
| 00:17:57 | 15.073 | 1.912 | 14.160 | 0.001 | 1.854E+12 | −0.17 |
| 00:18:03 | 15.198 | 1.915 | 14.137 | 0.001 | 1.851E+12 | 0.57 |
| 00:18:08 | 15.183 | 1.931 | 14.141 | 0.001 | 1.861E+12 | 0.04 |
| 00:18:13 | 15.154 | 1.931 | 14.160 | 0.001 | 1.862E+12 | −0.43 |
| 00:18:18 | 15.235 | 1.930 | 14.160 | 0.001 | 1.854E+12 | 0.29 |
| 00:18:23 | 15.249 | 1.935 | 14.179 | 0.001 | 1.859E+12 | −0.12 |
| 00:18:28 | 15.227 | 1.939 | 14.191 | 0.001 | 1.857E+12 | −1.32 |
| 00:18:33 | 15.396 | 1.933 | 14.199 | 0.001 | 1.833E+12 | −0.26 |
| 00:18:38 | 15.344 | 1.911 | 14.202 | 0.001 | 1.828E+12 | 1.90 |
| 00:18:43 | 15.161 | 1.929 | 14.206 | 0.001 | 1.864E+12 | −0.25 |

The operational data corresponding to these new conditions was used to calculate the different relevant resistances.

As mentioned before, the resistance after backwash for both permeation cycles will be calculated based on the average of the first five values that comply with the valid permeation cycle conditions. As it can be observed from the above table; the values prior to 0:06:47 do not meet the VPC conditions and consequently cannot be used for this calculation. The values corresponding from 0:06:47 to 0:07:07 are the first five values that comply with these conditions. For the second permeation cycle the same procedure is used. The value of $R_{ab}$ is calculated as follows:

$$R_{ab}(\text{cycle 1})=(1.908*10^{12}+1.839*10^{12}+1.844*10^{12}+1.836*10^{12}+1.861*10^{12})/5=1.857*10^{12}\,m^{-1}$$

$$R_{ab}(\text{cycle 2})=(1.840*10^{12}+1.854*10^{12}+1.851*10^{12}+1.861*10^{12}+1.862*10^{12})/5=1.853*10^{12}\,m^{-1}$$

$$\Delta R_{ab}=R_{ab}(\text{cycle 2})-R_{ab}(\text{cycle 1})=1.853*10^{12}-1.857*10^{12}=-4*10^{9}\,m^{-1}$$

As it has been previously established, $R_c$ can be estimated as follows:

$$R_c=M(T_2-T_1)$$

After performing the linear regression the value of the slope M was determined:

$$M=1.65*10^{10}\,m^{-1}/min$$

$$R_c=1.65*10^{10}\,m^{-1}/min*(9.99\,min)=1.648*10^{11}\,m^{-1}$$

From the analysis of the calculated resistances it can be concluded that the values of $\Delta R_{ab}$ and $R_c$ are both lower than their corresponding optimized set points, which means that the system is operating at the Green Zone and the application of the Energy Savings mode is available to reduce the MBR operational costs.

Following the established control hierarchy for the Energy Savings mode, the relaxation period duration was decreased from 1 min to 30 seconds and the net permeate flux was increased from 14 to 16 gfd by increasing the instantaneous flux from 15.4 to 17.6 gfd, while maintaining the remaining operational parameters constant. Optionally, the net permeate flux alone could have been adjusted as was done in the long term tests described further below. Although the control hierarchy gives a higher preference to other operational changes such as the decrease of the aeration frequency factor or aeration flow and the increase of the permeation cycle duration, these changes were difficult to implement due to intrinsic limitations of the MBR system in this example.

Immediately after the change in relaxation period duration and increase in net permeate flux, the operational data corresponding to these new operational conditions was used to calculate the different relevant resistances to assess the effectiveness of these measures on maintaining stable operational conditions while allowing for MBR operational costs savings. The procedure is the same as done previously.

Tables 1.5 and 1.6 contain some of the operational data corresponding to two consecutive permeation cycles of operation under the above described operational conditions. These operational data will be used to describe the resistance calculations.

TABLE 1.5

Permeation cycle 1 experimental data (experimental conditions 3).

| Time | FLUX (gfd) | TMP (psi) | Temp (° C.) | μ | Rt (m$^{-1}$) | dR/dT |
|---|---|---|---|---|---|---|
| 00:09:45 | 0.000 | 0.068 | 17.803 | 0.001 | N/A | N/A |
| 00:09:50 | 0.000 | −0.070 | 17.800 | 0.001 | N/A | N/A |
| 00:09:55 | 0.000 | 0.013 | 17.800 | 0.001 | N/A | N/A |
| 00:10:00 | 0.000 | 0.020 | 17.800 | 0.001 | N/A | N/A |

TABLE 1.5-continued

Permeation cycle 1 experimental data (experimental conditions 3).

| Time | FLUX (gfd) | TMP (psi) | Temp (° C.) | μ | Rt (m$^{-1}$) | dR/dT |
|---|---|---|---|---|---|---|
| 00:10:05 | 0.000 | 0.044 | 17.796 | 0.001 | N/A | N/A |
| 00:10:10 | 0.000 | −0.112 | 17.800 | 0.001 | N/A | N/A |
| 00:10:15 | 6.607 | 0.808 | 17.788 | 0.001 | 1.984E+12 | 4.781757 |
| 00:10:20 | 15.564 | 2.227 | 17.784 | 0.001 | 2.084E+12 | −7.69263 |
| 00:10:25 | 16.956 | 2.284 | 17.765 | 0.001 | 1.935E+12 | 1.196952 |
| 00:10:30 | 16.948 | 2.270 | 17.769 | 0.001 | 1.959E+12 | 1.201163 |
| 00:10:35 | 16.846 | 2.282 | 17.762 | 0.001 | 1.982E+12 | −0.05997 |
| 00:10:40 | 16.941 | 2.296 | 17.750 | 0.001 | 1.981E+12 | 0.573327 |
| 00:10:45 | 16.941 | 2.306 | 17.750 | 0.001 | 1.993E+12 | 0.402593 |
| 00:10:50 | 16.919 | 2.313 | 17.758 | 0.001 | 2.001E+12 | 0.783189 |
| 00:10:56 | 16.890 | 2.323 | 17.769 | 0.001 | 2.017E+12 | −1.33901 |
| 00:11:01 | 17.117 | 2.334 | 17.765 | 0.001 | 1.990E+12 | 0.347578 |
| 00:11:06 | 16.919 | 2.296 | 17.765 | 0.001 | 1.997E+12 | −0.7252 |
| 00:11:11 | 17.088 | 2.301 | 17.777 | 0.001 | 1.982E+12 | −0.55843 |
| 00:11:16 | 16.985 | 2.292 | 17.773 | 0.001 | 1.971E+12 | −0.22469 |
| 00:11:21 | 17.029 | 2.287 | 17.773 | 0.001 | 1.967E+12 | −0.17168 |
| 00:11:26 | 17.190 | 2.305 | 17.773 | 0.001 | 1.964E+12 | 2.277346 |
| 00:11:31 | 16.890 | 2.317 | 17.758 | 0.001 | 2.009E+12 | 0.058487 |

TABLE 1.6

Permeation cycle 2 experimental data (experimental conditions 3).

| Time | FLUX (gfd) | TMP (psi) | Temp (° C.) | μ | Rt (m$^{-1}$) | dR/dT |
|---|---|---|---|---|---|---|
| 00:20:19 | 0.000 | 0.048 | 17.765 | 0.001 | N/A | N/A |
| 00:20:24 | 0.000 | 0.082 | 17.773 | 0.001 | N/A | N/A |
| 00:20:29 | 0.000 | 0.010 | 17.769 | 0.001 | N/A | N/A |
| 00:20:34 | 0.000 | 0.021 | 17.773 | 0.001 | N/A | N/A |
| 00:20:39 | 0.000 | 0.030 | 17.762 | 0.001 | N/A | N/A |
| 00:20:44 | 0.000 | 0.004 | 17.754 | 0.001 | N/A | N/A |
| 00:20:49 | 6.658 | 0.838 | 17.750 | 0.001 | 1.971E+12 | 7.160825 |
| 00:20:54 | 15.125 | 2.175 | 17.746 | 0.001 | 2.124E+12 | −11.0537 |
| 00:20:59 | 17.139 | 2.259 | 17.731 | 0.001 | 1.912E+12 | 1.299441 |
| 00:21:04 | 17.124 | 2.262 | 17.712 | 0.001 | 1.937E+12 | 0.266417 |
| 00:21:09 | 17.190 | 2.286 | 17.708 | 0.001 | 1.943E+12 | 1.798625 |
| 00:21:14 | 17.007 | 2.291 | 17.704 | 0.001 | 1.978E+12 | 0.18199 |
| 00:21:19 | 17.022 | 2.315 | 17.704 | 0.001 | 1.982E+12 | −0.7813 |
| 00:21:24 | 17.205 | 2.312 | 17.712 | 0.001 | 1.966E+12 | 1.718922 |
| 00:21:29 | 17.007 | 2.321 | 17.720 | 0.001 | 2.001E+12 | 1.289662 |
| 00:21:34 | 16.861 | 2.337 | 17.712 | 0.001 | 2.027E+12 | −3.71094 |
| 00:21:39 | 16.956 | 2.407 | 17.697 | 0.001 | 1.954E+12 | 0.680588 |
| 00:21:44 | 17.139 | 2.313 | 17.712 | 0.001 | 1.968E+12 | 0.559187 |
| 00:21:49 | 16.861 | 2.308 | 17.704 | 0.001 | 1.979E+12 | 1.170542 |
| 00:21:54 | 16.802 | 2.299 | 17.712 | 0.001 | 2.002E+12 | −0.89163 |
| 00:22:00 | 16.970 | 2.310 | 17.697 | 0.001 | 1.985E+12 | 1.07242 |
| 00:22:05 | 16.941 | 2.322 | 17.697 | 0.001 | 2.006E+12 | 1.359174 |
| 00:22:10 | 16.787 | 2.333 | 17.697 | 0.001 | 2.034E+12 | −1.23236 |
| 00:22:15 | 17.036 | 2.342 | 17.689 | 0.001 | 2.009E+12 | −0.00051 |

The operational data corresponding to these different operational conditions was used to calculate the different relevant resistances.

As mentioned before, the resistance after backwash for both permeation cycles will be calculated based on the average of the first five values that comply with the valid permeation cycle conditions. As it can be observed from the above table; for the first permeation cycle the values prior to 0:10:20 do not meet these requirements and consequently cannot be used for this calculation. The values corresponding from 0:10:20 to 0:10:40 are the first five values that comply with these conditions. For the second permeation cycle the same procedure is used. The value of $R_{ab}$ is calculated as follows:

$$R_{ab}(\text{cycle 1})=(2.084*10^{12}+1.935*10^{12}+1.959*10^{12}+1.982*10^{12}+1.981*10^{12})/5=1.988*10^{12}\,m^{-1}$$

$$R_{ab}(\text{cycle 2})=(2.124*10^{12}+1.912*10^{12}+1.937*10^{12}+1.943*10^{12}+1.978*10^{12})/5=1.979*10^{12}\,m^{-1}$$

$\Delta R_{ab} = R_{ab}(\text{cycle 2}) - R_{ab}(\text{cycle 1}) = 1.979 * 10^{12} \text{ m}^{-1} - 1.988 * 10^{12} = \text{m}^{-1} = -9.00 * 10^9 \text{ m}^{-1}$ As it has been previously established, $R_c$ can be estimated as follows:

$$R_c = M(T_2 - T_1)$$

After performing the linear regression the value of the slope M was determined:

$$M = 1.67 * 10^{10} \text{ m}^{-1}/\text{min}$$

$$R_c = 1.67 * 10^{10} \text{ m}^{-1}/\text{min} * (9.99 \text{ min}) = 1.66 * 10^{11} \text{ m}^{-1}$$

From the analysis of the calculated resistances it can be concluded that the values of $\Delta R_{ab}$ and $R_c$ are both lower than their corresponding sustainable set points, which means that the system is operating at the Green Zone and the application of the Energy Savings mode is available to reduce the MBR operational costs, while maintaining sustainable operational conditions in the system.

Figure 4:
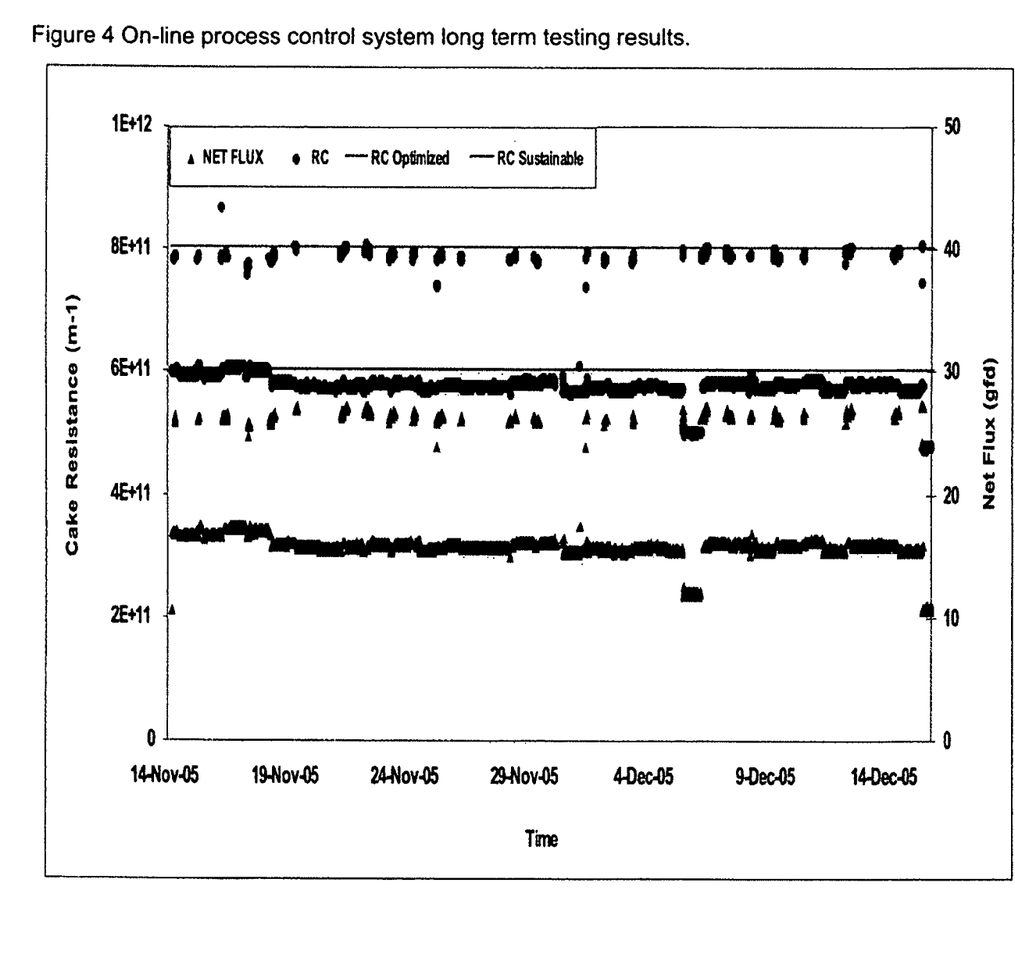
FIG. 4 is a graph of experimental results.

FIG. 4 presents the long term results obtained from testing using a system similar to that above except that dR/dT was not used as a VPC condition and A.F.F. was the only controlled parameter. FIG. 3 shows the net permeate flux with the obtained cake resistance for each permeation cycle along with the values of the sustainable and optimized cake resistance, respectively. During this testing, frequent peak flux events were simulated by increasing the net permeate flux from 16 up to 26 gfd. These peak flux events were performed to assess the sensitivity of the on-line process control system when faced with operational disturbances.

As it can be observed in FIG. 4, as the net permeate flux increased from 16 gfd to 26 gfd the cake resistance also increased. During some of the peak flux events the obtained values of cake resistance exceeded the sustainable cake resistance set point value causing the system to operate in Fouling Removal mode hence using an aeration frequency factor of 0.5.

However, during most permeation cycles the obtained values of cake resistance were around the optimized set point allowing the system to operate in the Energy Savings mode hence using an aeration frequency factor of 0.25. The obtained values of $\Delta R_{ab}$ were used but are not presented in FIG. 4. The observed trend of $\Delta R_{ab}$ was very similar to that of the cake resistance. Table 1.7 presents the percentage and number of cycles performed at each aeration frequency factor.

TABLE 1.7

On-line process control system long term testing summary.

| A.F.F | Aeration Frequency | % Performed | Number of Cycles |
|---|---|---|---|
| 0.25 | 10 ON/30 OFF | 87 | 4007 |
| 0.5 | 10 ON/10 OFF | 13 | 602 |

As it can be observed in Table 1.7 for the vast majority of the permeation cycles the air consumption was reduced by 50% by prolonging the OFF time from 10 up to 30 seconds, which led to a significant reduction in the energy requirements of the MBR system.

The invention claimed is:

1. A process for treating water comprising the steps of,
    a) providing a water treatment system having filtering membranes for withdrawing filtered permeate from water being treated and operable according to two or more discrete modes of operation, the modes of operation differing in their effect on the fouling of the membranes;
    b) operating the system in one of the modes of operation in each of a plurality of periods of time;
    c) determining the value or values of one or more parameters related to a resistance of the membranes from time to time while operating the system;
    d) considering one or more of the value or values of the one or more parameters in choosing the mode of operation for one or more of the periods of time.

2. The process of claim 1 wherein the two or more discrete modes of operation differ from each other in relation to one or more of (a) backwashing regimen, (b) permeation regimen, (c) air scouring regimen, (d) membrane chemical cleaning regimen or (e) sludge filterability enhancement regimen.

3. The process of claim 1 wherein the two or more discrete modes of operation differ in the ratio of time in which the membranes are air scoured relative the time in which the membranes are not air scoured.

4. The process of claim 1 wherein the one or more parameters include one or more parameters selected from the group of (a) adsorptive fouling resistance, (b) cake resistance or (c) a change over time in total resistance after backwash.

5. The process of claim 1 wherein the modes of operation differ at least in relation to air scouring regimen and the one or more parameters includes a parameter related to cake resistance.

6. The process of claim 1 wherein step (d) of claim 1 further comprises comparing one or more values of parameters with at least one of a set of two or more reference values associated with each of the values being compared.

7. The process of claim 6 wherein the two or more reference values include a higher value and a lower value and the mode of operation is changed when one or more values of parameters is above its associated higher reference value or below its associated lower reference value.

8. The process of claim 1 wherein changes in mode of operation are made following a hierarchy of available process changes.

9. A process for providing scouring bubbles to a membrane unit comprising the steps of,
    a) providing a flow of a gas in the form of bubbles which rise past the membrane unit;
    b) alternating the rate of flow of the gas between a value in a first range of flow rates and a value in a second range of flow rates, the second range of flow rates ranging from no flow to a flow rate below the first range of flow rates;
    c) altering the length of time that the gas flows at the second flow rate compared to the length of time that the gas flows at the first flow rate considering a parameter related to a resistance of the membrane unit.

* * * * *